United States Patent Office 2,764,932
Patented Oct. 2, 1956

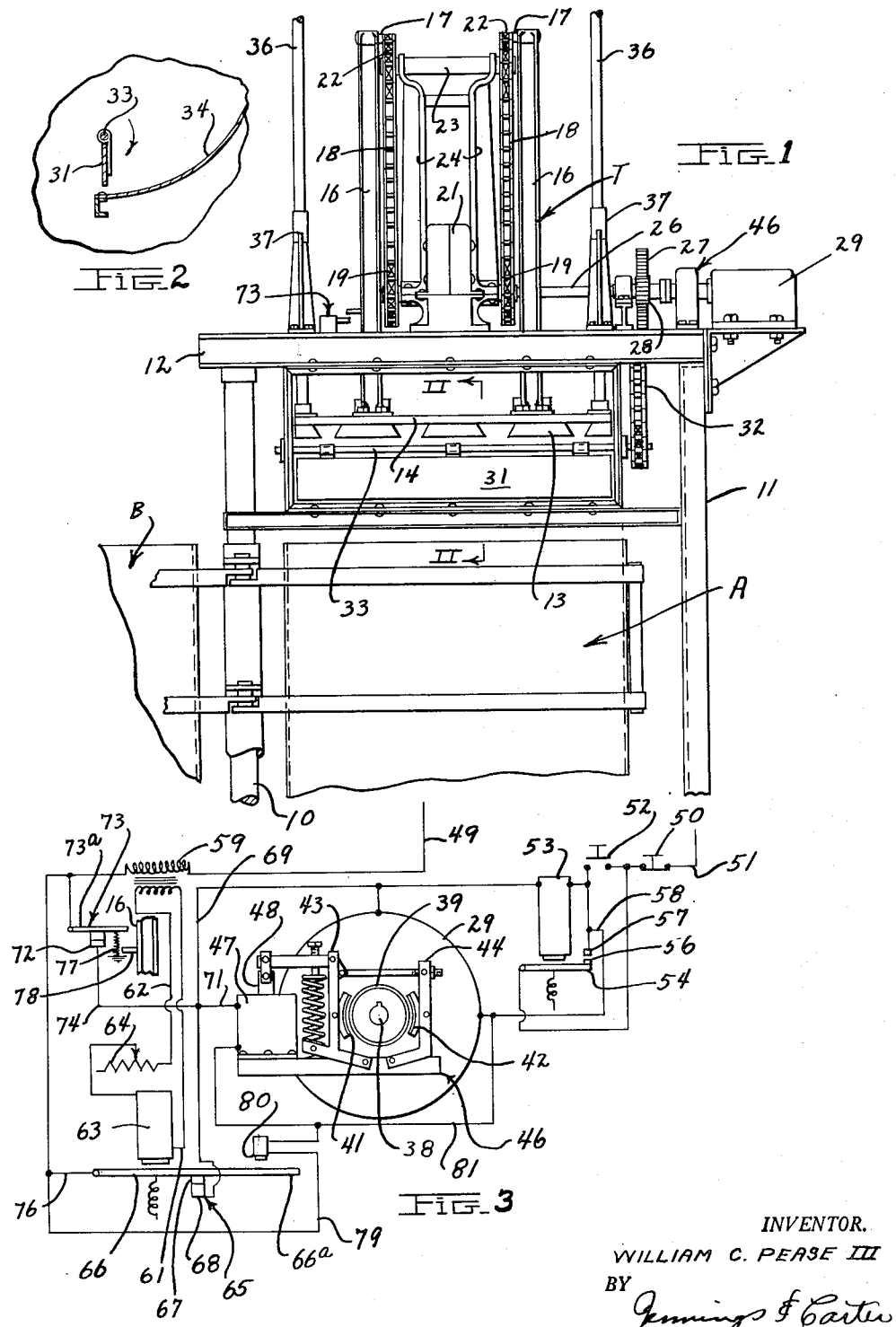

2,764,932

AUTOMATIC BALE DENSITY MECHANISM FOR FIBER PRESSES AND THE LIKE

William C. Pease III, Columbus, Ga., assignor to Lummus Cotton Gin Company, a corporation of Georgia Application May 14, 1954, Serial No. 429,754

4 Claims. (Cl. 100—50)

My invention relates to apparatus for baling fibers, and while not limited thereto relates to such apparatus especially adapted for baling lint cotton and the like.

In the baling of cotton and the like with present day presses, it is customary to feed the lint from the condenser into a press box and to pack the cotton in the box by tramping mechanism driven by an electric motor. In some types of such apparatus the cotton is fed to the press box on a slide and a mechanically operated lint slide kicker paddle aids in delivering the cotton to the press box.

In the baling of cotton it is desirable that all bales be of uniform weight. Among the reasons for this are that uniformly heavy bales aid the transit loading thereof, make possible accurate division of loads on multibale trailers, avoid compress penalties due to over or under weight bales, and so forth.

Attempts have been made to guage the weight of cotton fed to the press box. Some of these means comprise current indicating instruments in circuit with the electric motor driving the trampers, whereby an operator, by observing the instruments, could estimate the weight of cotton in the bale by the amount of current drawn by the motor on the down stroke of the trampers. By the indications of the instrument the operator is supposed to throw a switch at the proper time to stop the apparatus. Such devices are inaccurate and difficult to operate due to the short duration of the high current peaks during which the operator is to throw the switch and also requires operator's attention. Mechanical pressure indicating devices attached to the press box likewise have been found to have many disadvantages. A well-trained press operator can determine fairly accurately the weight of a bale by feeling the density thereof by hand, pressing the bale with a stick or the like, or by observing the strain on the press box dogs. However, considerable training and practice are required for this and even skilled operators make frequent errors. In summary, so far as I am aware, all prior apparatus and methods of obtaining bales of cotton having uniform weight are not entirely satisfactory.

In view of the foregoing the prime object of my invention is to provide apparatus for baling cotton embodying means effective automatically to stop the apparatus when a given amount of cotton has been delivered thereto.

Another object is to provide apparatus of the character designated in which the baling mechanism is stopped with the trampers in the raised or withdrawn position, whereby the press box may be rotated to bring the filled and tramped section under the press plate.

Another object is to provide in circuit with the electric motor for the trampers a normally closed switch which opens when the motor draws a predetermined amount of current, together with a limit switch opened when the trampers are in their raised position, whereby when the density of the bale reaches a pre-determined point as determined by the pre-determined amount of current that the motor draws on the down stroke of the trampers, the first named switch opens, readying the motor for de-energization when the limit switch opens, thereby stopping the apparatus after a given amount of cotton has been put in the press box and bringing the same to rest with the trampers in raised position.

Another object is to provide in combination with the electric motor for the trampers, a spring set, magnetically releasable brake operatively associated with the shaft of the motor, and means automatically responsive to a given flow of current in the motor circuit to open a first switch which is effective to ready the de-energization of the electrical system and permit setting of the brake, there being a second switch in the circuit opened when the trampers are raised, thereby de-energizing the electrical system, assuring that the mechanism comes to rest with the trampers at the proper position.

A further object is to provide apparatus of the kind indicated in which the switch which opens in response to a given current drawn by the motor is provided with means to hold the same open until the limit switch opens, and in which the solenoid of the brake and the motor are de-energized only when both of said switches are open at the same time.

Apparatus illustrating the features of my invention is shown in the accompanying drawings forming a part of this application in which:

Fig. 1 is a somewhat diagrammatic view, partly broken away and in section, and showing the upper section of a standard press box with the tramper in raised position;

Fig. 2 is an enlarged detail sectional view taken generally along line II—II of Fig. 1 and showing in somewhat diagrammatic manner the lint slide kicker paddle; and Fig. 3 is a wiring diagram.

Referring now to the drawings for a better understanding of my invention I show in somewhat diagrammatic manner a two box cotton press and a tramper unit mounted over one of said boxes. As will be understood, this type of press embodies two boxes A and B. The boxes are mounted for rotary movement about a vertically disposed column 10 so that when lint cotton is placed in one of the boxes, for instance the box A, the bale may be pressed by mechanism not shown and which is mounted over the other box B which has previously been filled and has been tamped with lint cotton.

Mounted over the box A on suitable supporting frame work 11 and 12 is a tramping unit which is indicated generally by the letter T. While my invention is adapted for association with a large number of different tramping mechanisms, I show the same in association with a tramper manufactured by the Lummus Cotton Gin Company of Columbus, Georgia, and which is shown more in detail in Bulletin No. 645 issued by said company and entitled "Double Box Presses." As will be understood, the tramping unit comprises the trampers 13 which are mounted on a beam 14. The beam 14 may be reciprocated up and down by means of cranks 16. The cranks may be pivotally mounted at their upper ends on pins 17 which project from an attachment mounted on one flight of chains 18. The chains 18 pass over lower sprockets 19 which are driven from a reduction gear box 21. The chains also pass over upper sprockets 22 which may be journaled on a shaft 23 mounted in vertically disposed supporting brackets 24. The chains are driven by means of a shaft 26 on which is mounted a large gear 27. Gear 27 may be driven from a pinion 28 in turn driven by electric motor 29. Also, there may be mounted in the framework of the apparatus a rotating lint slide paddle 31 which is driven in synchronism with the trampers by means of a chain 32 which in turn may be driven from the motor 29. As is understood, the paddle 31 is mounted on a shaft 33 which is driven by the chain 32 and is positioned adjacent the lower end of the lint slide 34 down which the bat of lint comes from the condenser. Thus, once in each cycle, while the tramper is raised, the paddle 31 makes a revolution and therefore pushes the bat of cotton into the press box A. The tramper beam 14 may be guided in its vertical reciprocation by means of rods 36 which reciprocate in bearings 37.

The apparatus so far described is substantially identical with that shown in the above mentioned bulletin and is well known in the art.

My invention consists of an electrical control system effective, after a predetermined amount of cotton has been delivered to the box beneath the tramping unit, to stop the apparatus with the parts substantially in the position shown in Fig. 1.

Referring now more particularly to Fig. 3 of the drawings I show a shaft 38 of the motor 29 as having thereon a brake drum 39. Surrounding the brake drum are brake shoes 41 and 42 mounted on the usual actuating arms 43 and 44 of a spring set, magnetically releasable brake which is indicated generally by the numeral 46. While various forms of brakes may be employed, a suitable type is shown in price list 15–340 issued by the Westinghouse Electric Corporation, of Buffalo, New York, and dated June 10, 1947. As will be understood, the brake in question embodies a solenoid 47 the armature 48 of which is connected to the arm 43 and to the arm 44, through the links indicated in the drawing. When the solenoid is energized the armature moves down into the coil thereof thus releasing the brake as indicated in Fig. 3.

Current for the motor 29 may be supplied through leads 49 and 51. A normally open start switch 52 may be biased to open position by a spring not shown and is effective when momentarily closed to energize coil 53 of a relay. A normally closed stop switch 50 may be placed in line 51. The relay may have a contact arm 54 carrying a switch contact 56 which, when the coil 53 is energized closes upon a stationary contact 57. Arm 54 is biased to open switch position. A holding circuit for the relay 53 may be provided by means of the lead 58 and the circuit shown as will be understood.

Associated with the motor circuit is a current transformer 59 connected by leads 61 and 62 to the coil 63 of an instantaneous over current relay of very high accuracy. The coil 63 may be under control of a rheostat 64 as indicated in the drawings whereby the point at which the relay is energized to trip its associated switch may be regulated as will later appear. The relay controls a switch 65 having an arm 66 carrying a contact 67 which is held normally closed against a stationary contact 68. The stationary contact 68 is connected to a lead 69 which is connected to one terminal of the motor, to one terminal of the solenoid through a branch lead 71 and to a stationary contact 72 of a limit switch 73, through a lead 74. The movable contact arm 66 is connected by a branch lead 76 to the power input line 49.

The limit switch 73 is normally closed by a spring 77 and the switch has an extension which is adapted to be engaged by a projection 78 on one of the vertically reciprocating cranks 16. The switch 73 is so arranged that it is opened by the engagement of its arm 73a by the member 78 as the member 16 nears its upward stroke but just in time for the member 78 to slip past arm 73a thus momentarily opening the switch 73 and permitting it to close again.

From the description so far given it will be seen that when the start button 52 is momentarily closed the motor 29 is energized and the coil 47 of the solenoid releases the brake so that the motor is free to turn. It will be noted that the switches 65 and 73 are in parallel with each other and individually are in series with the motor. Thus, when either of the switches 65 or 73 is closed, the brake solenoid coil 47 and the motor 29 are energized. Thus, when the motor is driving the tramper on its down stroke and when the box is filled with a predetermined amount of fiber, the current drawn by the motor reaches the amount to fully energize coil 63. When this happens switch 65 is opened, readying the system for complete de-energization upon opening of switch 73. Coils 53 and 47 and the motor 29 remain energized until switch 73 is momentarily opened by the engagement of the lug 78 with the arm 73a.

In order to hold the switch 65 open pending the opening of switch 73 in response to full energization of coil 63, I provide an auxiliary electromagnet 80 which is connected at one side to the line 49 through a lead 79 and at the other to the contact 57 through a line 81 which, incidentally, also connects to the other side of the solenoid coil 47. Switch arm 66 is provided with metallic extension 66a so that whenever coil 63 is energized switch 65 is held open by the auxiliary electro-magnet 80 until the switch 73 also is opened. It will also be noted that as soon as switch 73 opens, if switch 65 also is open, the holding circuit for the coil 53 is broken, permitting the contacts 56 and 57 to separate, thus de-energizing the entire system. The system can only be energized by momentarily closing switch 52.

From the foregoing the method of constructing and using my improved bale density control mechanism and the advantages thereof will be readily understood. With the trampers being driven up and down by motor 29 it will be seen that when the same are in raised position the lint slide kicker paddle 31 feeds cotton into the box underneath the tramping mechanism. The trampers come down and press the cotton in the ordinary manner. As soon as the motor draws a predetermined relatively high amount of current representing a certain degree of compaction of the lint which in turn represents the total weight of lint in the box, such current flows through the coil 63. This flow of current above the ordinary amount drawn by the motor during the initial packing of the fiber opens the switch 65 and the auxiliary electro-magnet 80 holds this switch open until the extension 78 on the member 16 momentarily opens the switch 73. The location of the extension 78 on the member 16 is such that the normal coasting of the parts after breaking of the contacts of switch 73 brings the entire mechanism to rest with the trampers in raised position. The stopping can be substantially instantaneous due to the solenoid brake and accurate control over the stopping point of the apparatus therefore is afforded at all times. Likewise, by adjusting the rheostat 64 the current flow at which the coil 63 is energized, and hence the weight of the bale can be varied.

From the foregoing it will be apparent that I have devised an improved apparatus for assuring that bales of fiber such as lint cotton and the like being baled in baling apparatus are of uniform weight. My improved apparatus is extremely accurate and while sensitive to peak current conditions to determine accurately the weight of cotton in a given bale, the apparatus is not overly sensitive. It will be apparent to those skilled in the art that a relay 63 can be selected which is fully effective to interrupt the circuits as indicated when the motor draws a predetermined amount of current and yet which will not trip its switch with normal current fluctuations. It will be further noted that the auxiliary electro-magnet 80, through which current flows whenever the apparatus is in operation, can be of such strength and so disposed relative to the extension 66a of the arm 66 that it will not open switch 65 until the extension 66a is brought into close proximity thereto. However, when the extension is brought into close proximity the auxiliary electro-magnet is effective to hold the circuit open until current ceases to flow in its coil.

In actual operation I have found that my invention is effective for its intended purposes and that the weight of bales of lint cotton or the like can consistently be controlled within very narrow limits.

While I have shown my invention in but one form, it will be obvious to those skilled in the art that it is not

What I claim is:

1. The combination with fiber baling apparatus of the kind having movable portions including movable fiber packing means driven by an electric motor, of means automatically to stop said apparatus after a predetermined weight of fiber has been packed therein comprising an electrically openable switch disposed when closed to energize the motor, a mechanically openable switch disposed when closed to energize the motor, circuits connecting said switches in parallel relation to each other and individually in series with the motor, means responsive to a predetermined current demand of the motor to open the electrically openable switch, and means associated with a moving portion of the baling apparatus to open the mechanically openable switch.

2. Apparatus as defined in claim 1 in which the electrically openable switch has means associated therewith effective, upon opening of the same, to hold it open until the mechanically openable switch is opened by said moving portion of the apparatus.

3. The combination with fiber baling apparatus of the kind having movable portions including movable fiber packing means driven by an electric motor, of means automatically to stop said apparatus after a predetermined weight of fiber has been packed in said apparatus comprising a normally closed first switch openable by a moving portion of the apparatus when the parts thereof are out of fiber packing position, a spring set electromagnetically releasable brake operatively connected with the motor and effective when the electro-magnet thereof is de-energized to stop the apparatus, a normally closed second switch having an electro-magnet effective when energized to open said second switch, circuits connecting each of said switches to the motor and to the electro-magnet of the brake whereby the same are energized when either of said switches is closed, means operable upon a predetermined current demand of the motor to energize the electro-magnet associated with said second switch thereby to open the same, and means to hold open the switch controlled by said electro-magnet, whereby opening of the first said switch by said moving part of the apparatus de-energizes the electro-magnet of the brake and said motor.

4. The combination with fiber baling apparatus of the kind having movable portions including vertically reciprocable trampers driven by an electric motor, of means for stopping the apparatus with the trampers in raised position after delivery thereto of a predetermined weight of fiber to make a bale comprising a relay controlled normally open first switch, a normally open starting switch for momentarily energizing the relay of the said first switch, a holding circuit for the relay of said first switch controlled by the said first switch, a normally closed second switch which is momentarily opened by a moving portion of the apparatus each time the trampers move substantially to raised position, a normally closed third switch openable upon energization of an electro-magnet associated therewith, a spring set magnetically releasable brake associated with the motor, circuits connecting the first, second and third switches to the motor and electro-magnet of the brake whereby the same are energized whenever the first together with either the second or third switches are closed, means to energize the electro-magnet of the third switch after a predetermined weight of fiber has been packed in said apparatus, thereby to open the third switch, and means to hold the third switch open until the second switch opens.

References Cited in the file of this patent

UNITED STATES PATENTS

| | | |
|---|---|---|
| 1,645,906 | Hansen | Oct. 18, 1927 |
| 1,728,503 | Mourfield | Sept. 17, 1929 |
| 1,977,423 | Blazek et al. | Oct. 16, 1934 |
| 2,210,591 | Langford et al. | Aug. 6, 1940 |